(12) United States Patent
Hirakawa

(10) Patent No.: US 7,116,499 B2
(45) Date of Patent: Oct. 3, 2006

(54) WIDE-ANGLE LENS SYSTEM

(75) Inventor: Jun Hirakawa, Kanagawa (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/111,864

(22) Filed: Apr. 22, 2005

(65) Prior Publication Data

US 2005/0237627 A1    Oct. 27, 2005

(30) Foreign Application Priority Data

Apr. 27, 2004   (JP)   ............................. 2004-131996

(51) Int. Cl.
*G02B 13/04*   (2006.01)
(52) U.S. Cl. ...................................... 359/753; 359/749
(58) Field of Classification Search ................ 359/749, 359/750, 751, 752, 753, 784
See application file for complete search history.

(56) References Cited

U.S. PATENT DOCUMENTS

| | | | |
|---|---|---|---|
| 5,724,193 | A | 3/1998 | Hirakawa |
| 5,734,510 | A | 3/1998 | Ito |
| 5,991,093 | A | 11/1999 | Murata et al. |
| 6,697,202 | B1 | 2/2004 | Mori |
| 6,735,019 | B1 | 5/2004 | Kanai |

FOREIGN PATENT DOCUMENTS

| JP | 6-160706 | 6/1994 |
|---|---|---|
| JP | 2003-029141 | 1/2003 |

OTHER PUBLICATIONS

English language Abstract of JP 2003-029141.

*Primary Examiner*—David N. Spector
(74) *Attorney, Agent, or Firm*—Greenblum & Bernstein, P.L.C.

(57) ABSTRACT

A wide-angle lens system includes a negative first lens group, a negative second lens group, and a positive third lens group. The negative first lens group includes at least two negative meniscus lens elements each having the convex surface facing toward the object, and a positive lens element provided on the image-side of the two negative meniscus lens elements. The negative second lens group includes cemented lens elements and a negative meniscus lens element having the convex surface facing toward the object. The wide-angle lens system satisfies the following conditions:

$$f_{2\text{-}3}/f > 1.6 \quad (1)$$

$$f_3/f > 1.5 \quad (2)$$

$$(f_{2\text{-}3}/f)/(f_3/f) > 1.0 \quad (3)$$

wherein
$f_{2\text{-}3}$ designates the combined focal length of the negative second lens group and the positive third lens group;
f designates the focal length of the entire wide-angle lens system; and
$f_3$ designates the focal length of the positive third lens group.

6 Claims, 6 Drawing Sheets

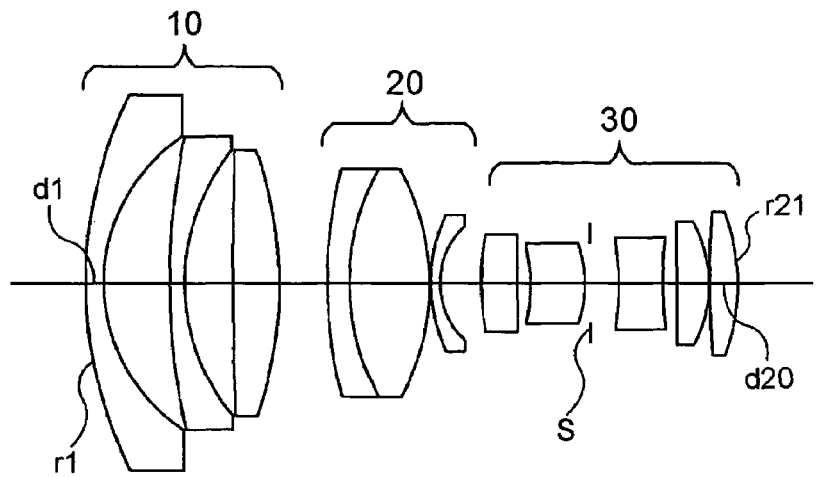
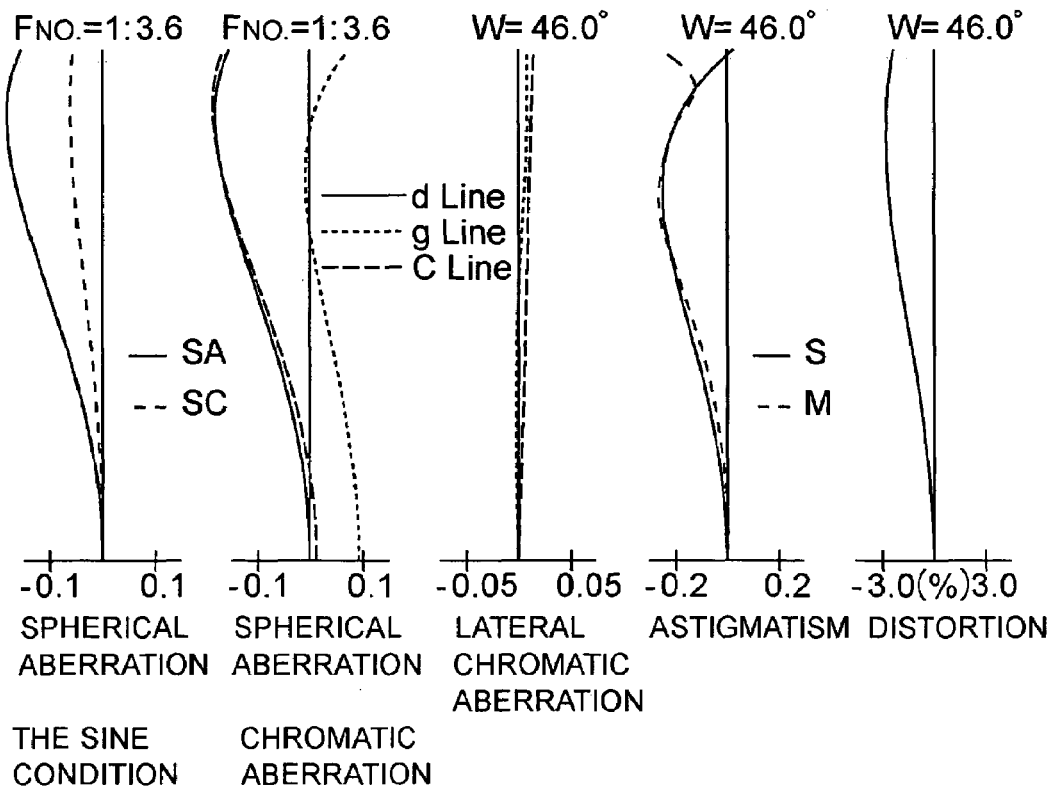

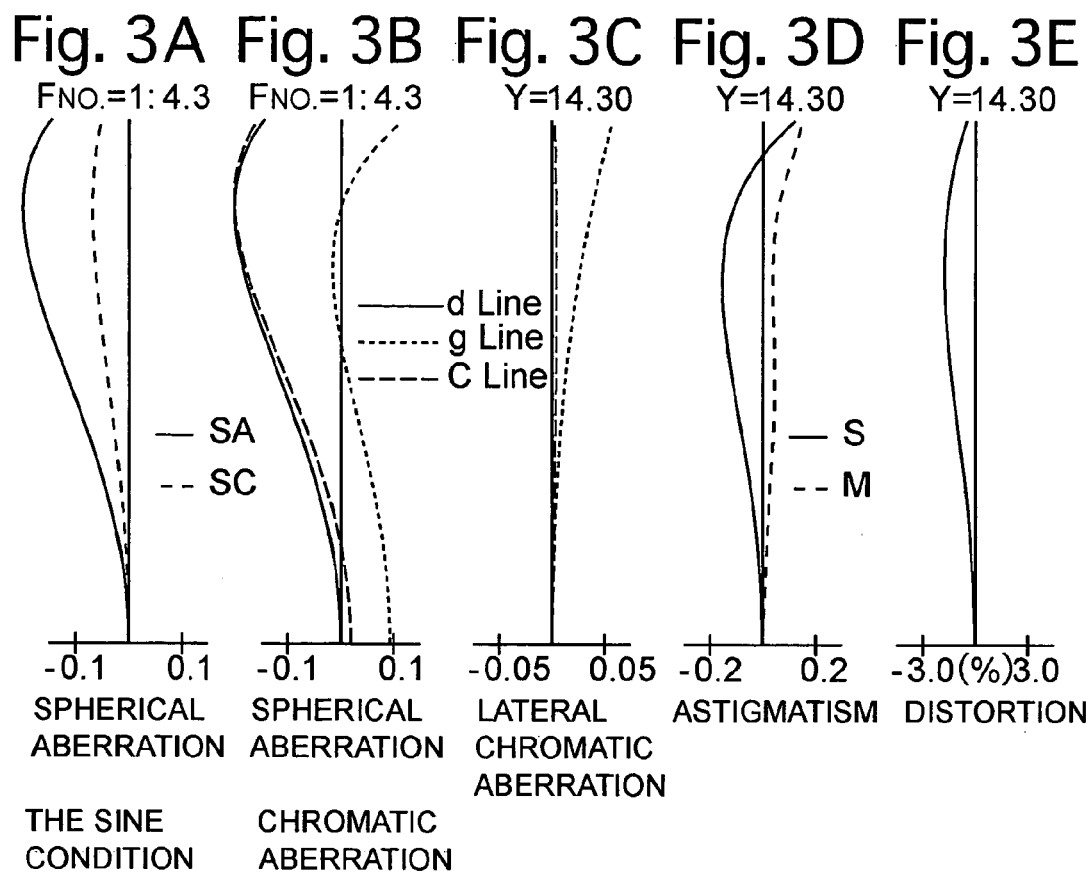
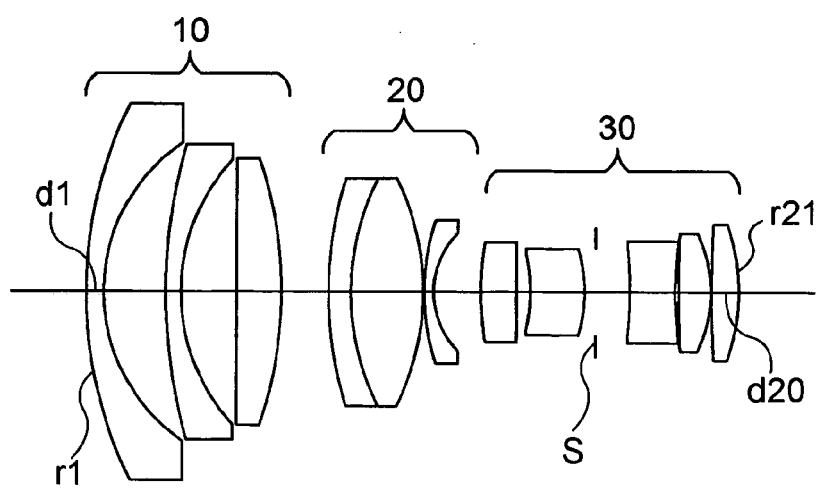

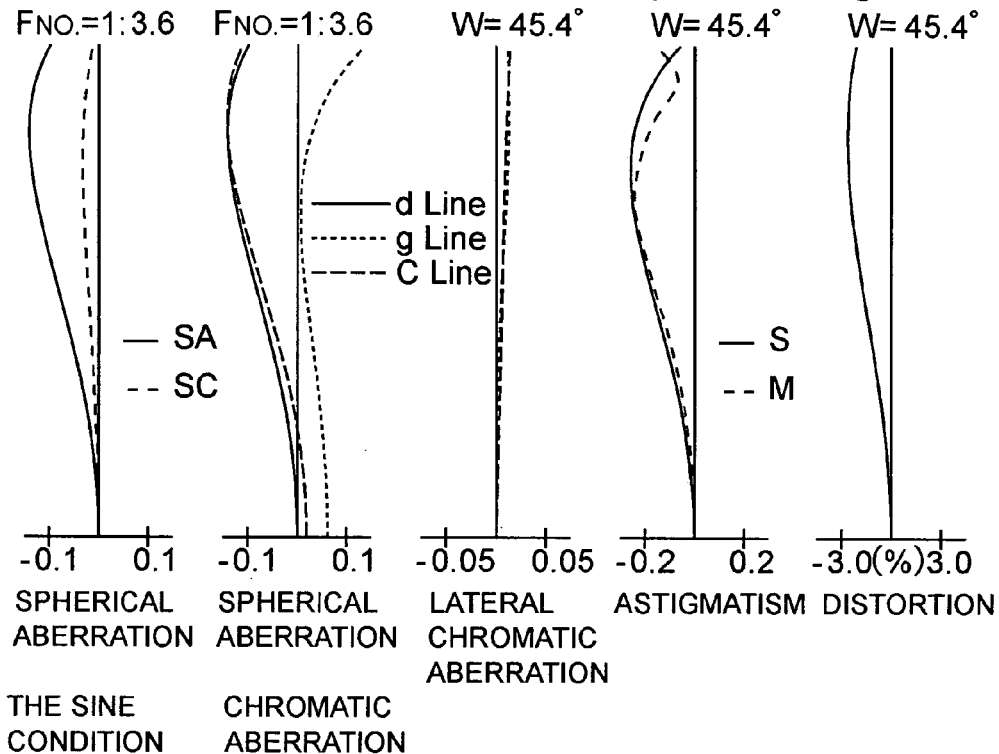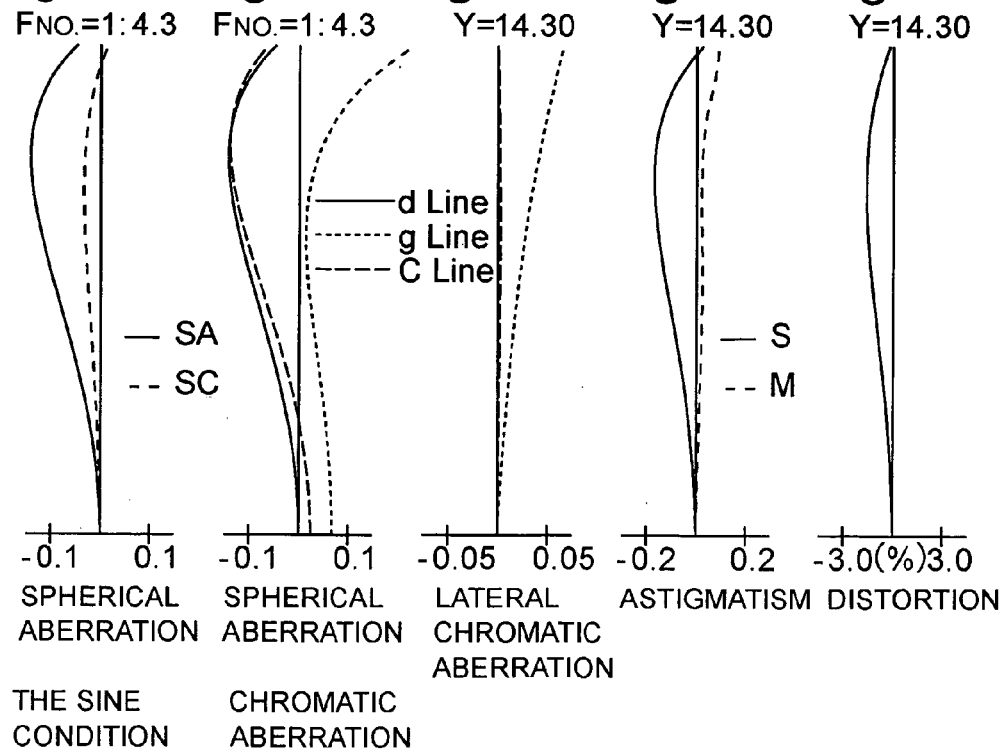

Fig. 7
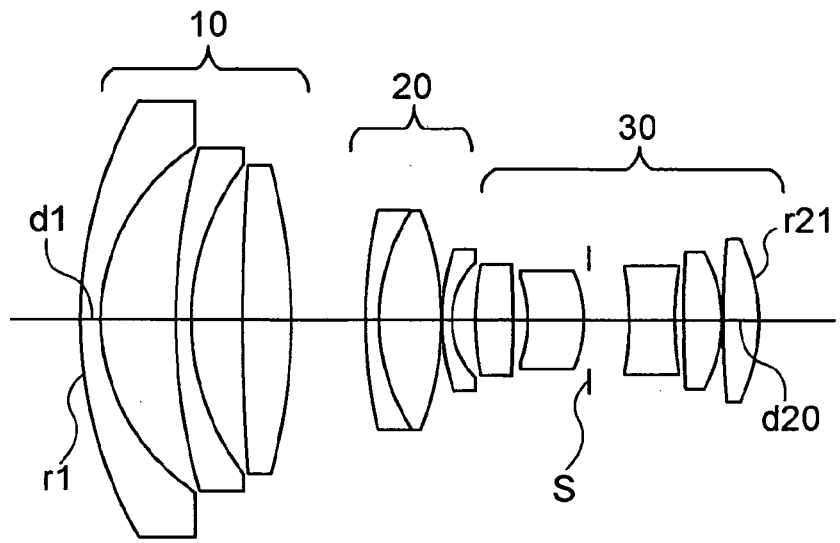
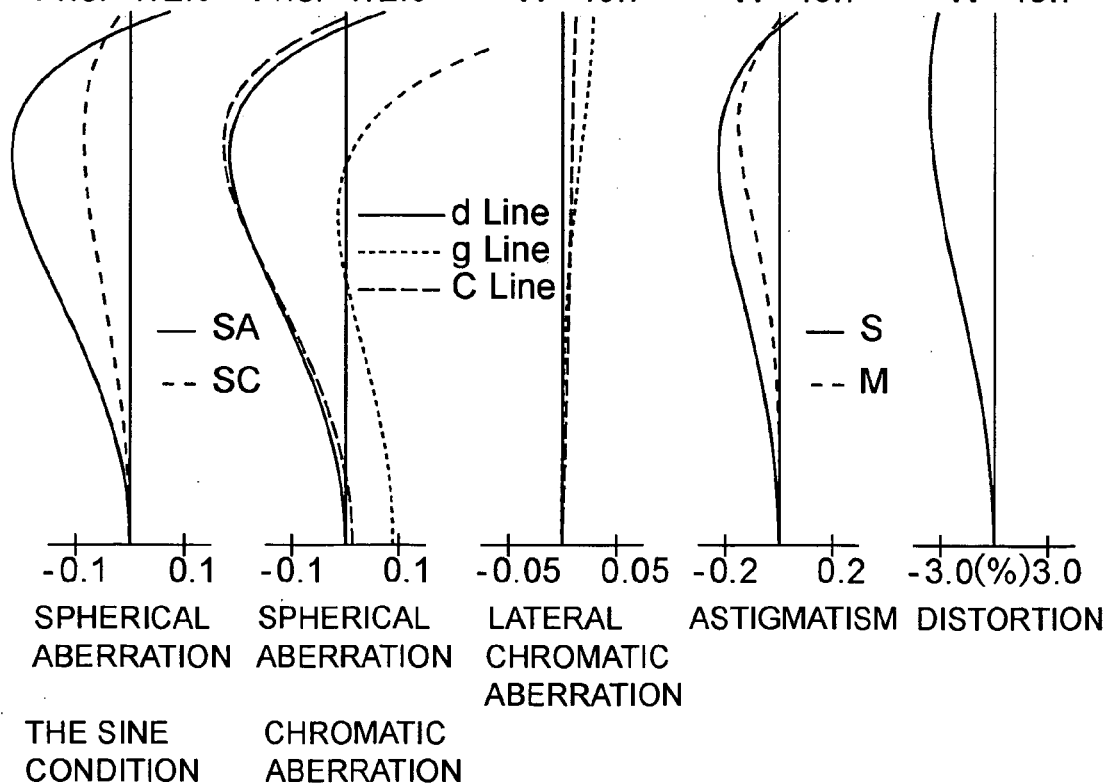
Fig. 8A  Fig. 8B  Fig. 8C  Fig. 8D  Fig. 8E

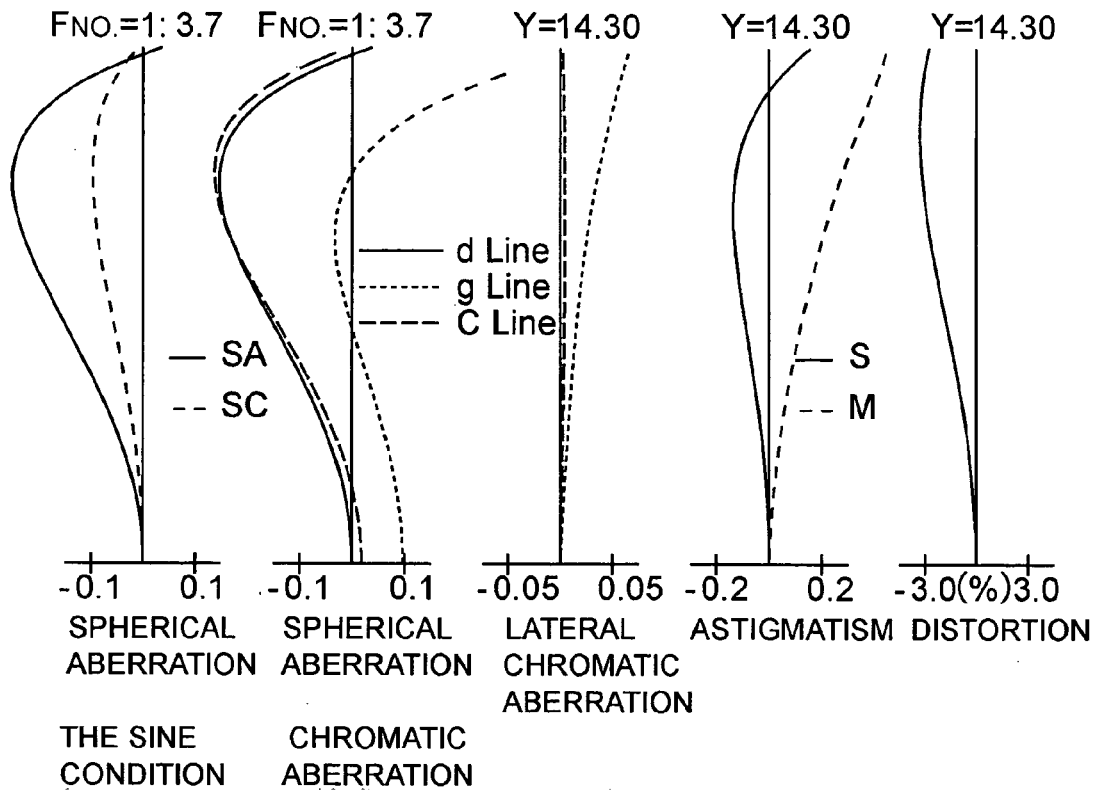
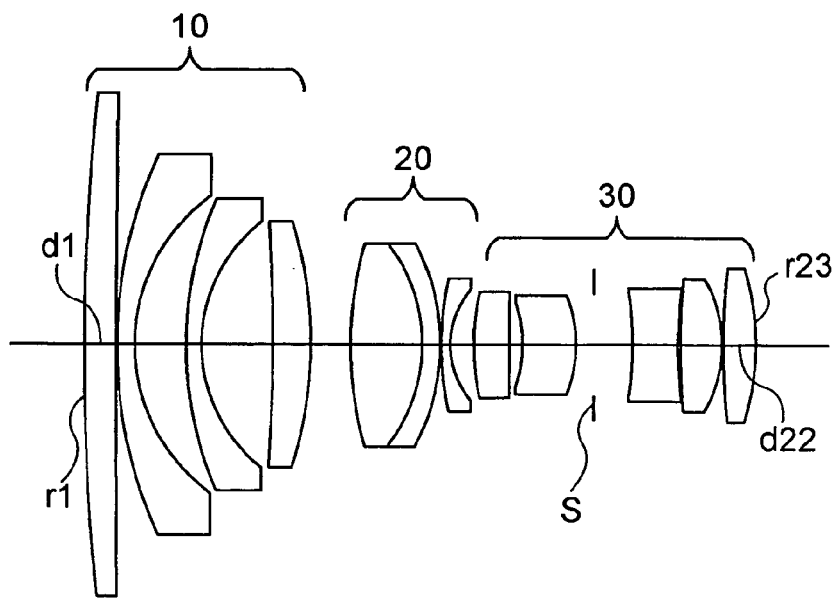

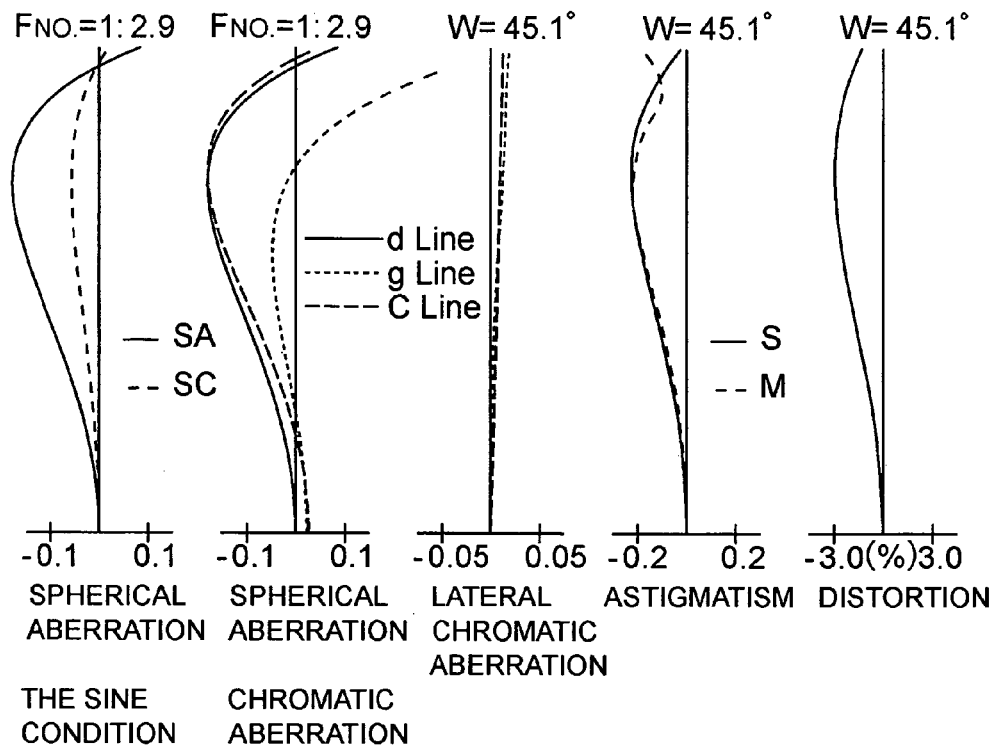
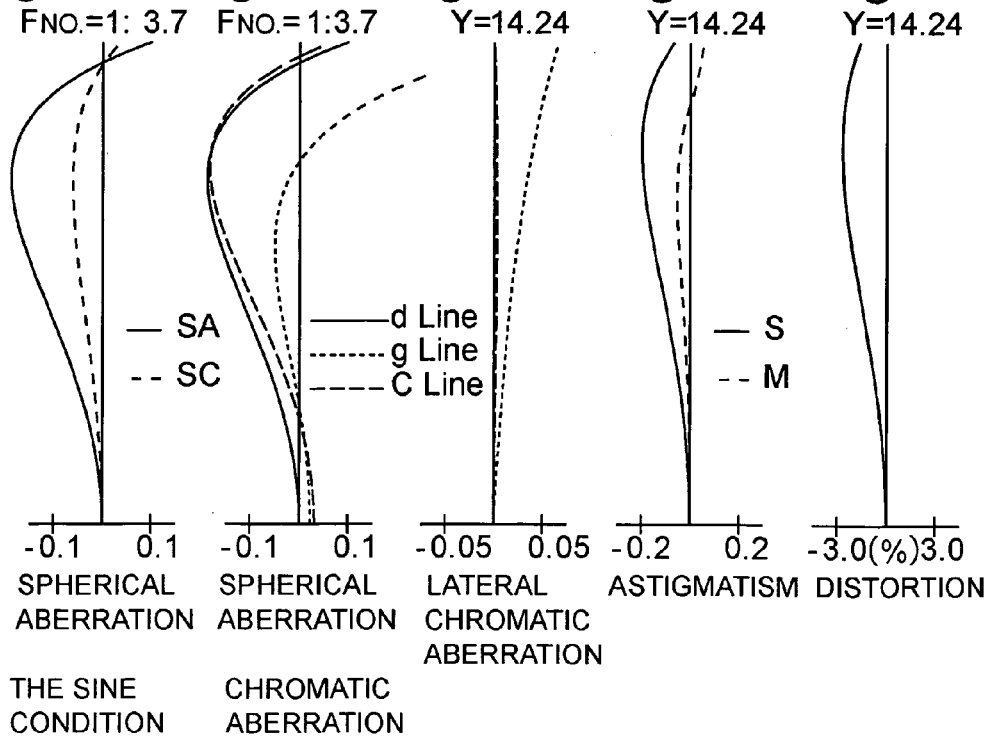

WIDE-ANGLE LENS SYSTEM

BACKGROUND OF THE INVENTION

1. Field of the Invention

The present invention relates to a wide-angle lens system used in a single-lens-reflex (SLR) type electronic digital still camera (hereinafter, a digital SLR camera).

2. Description of the Prior Art

A digital SLR camera has usually employed an imaging device whose picture size is smaller than the picture size of a SLR camera with a silver-halide film (hereinafter, an SLR camera), since it has been difficult to increase the size of an imaging device.

On the other hand, the lens mount of a digital SLR camera is often made common to that of an SLR camera, such as ones disclosed in Japanese Unexamined Patent Publication (JUPP) No. 6-160706 and JUPP No. 2003-29141. Due to this arrangement, many types of photographic lenses for SLR cameras, which have already been available on the market, can be utilized as an exchangeable photographic lens for digital SLR cameras.

However, in the case where a photographic lens for an SLR camera is used with a digital SLR camera, the angle-of-view at the position of the imaging device becomes narrower such as like the so-called trimming. This is because a photographic lens for an SLR camera is designed to correspond to the picture size for a silver-halide film which is larger than the picture size for the imaging device of a digital SLR camera.

Accordingly, an exclusive exchangeable photographic lens for a digital SLR camera having a much wider angle-of-view has been desired. However, as explained, the lens mount of a digital SLR camera has frequently been made common to that of an SLR camera. Therefore the back focal distance equivalent to that of a SLR camera is structurally required, and a wider angle-of-view becomes inevitably necessary to the extent that a bundle of light rays carrying an object image does not fit the picture size for the imaging device. Namely, in order to obtain a wider angle-of-view to meet the picture size for the imaging device, the back focal distance should be shorter to make the angle-of-view wider; however, in this case where the lens mount is commonly used between an SLR camera and a digital SLR camera, the longer back focal distance is required in a digital SLR camera. For example, in the case of an SLR camera with the 35 mm-film format, the back focal distance which is approximately 1.6 times of the radius of an image circle is necessary; while in the case of a digital SLR camera with the imaging device (CCD) of 23.5 mm×15.7 mm size, the back focal distance is required to be approximately 2.5 times of the radius of an image circle.

SUMMARY OF THE INVENTION

The present invention provides a wide-angle lens system which attains a half angle-of-view of approximately 45° or more, and also attains a longer back focal distance.

According to an aspect of the present invention, there is provided an wide-angle lens system including a first lens group having a negative refractive power (hereinafter, a negative first lens group), a second lens group having a negative refractive power (hereinafter, a negative second lens group), and a third lens group, with a diaphragm, having a positive refractive power (hereinafter, a positive third lens group), in this order from the object.

The negative first lens group includes at least two negative meniscus lens elements each having the convex surface facing toward the object, and a positive lens element provided on the image-side of the two negative meniscus lens elements.

The negative second lens group includes cemented lens elements and a negative meniscus lens element having the convex surface facing toward the object.

The wide-angle lens system satisfies the following conditions:

$$f_{2\text{-}3}/f > 1.6 \tag{1}$$

$$f_3/f > 1.5 \tag{2}$$

$$(f_{2\text{-}3}/f)/(f_3/f) > 1.0 \tag{3}$$

wherein $f_{2\text{-}3}$ designates the combined focal length of the negative second lens group and the positive third lens group;

f designates the focal length of the entire wide-angle lens system; and $f_3$ designates the focal length of the positive third lens group.

The wide-angle lens system preferably satisfies the following condition:

$$np1 > 1.75 \text{ and } vp1 < 30 \tag{4}$$

wherein np1 designates the refractive index of the positive lens element provided on the image-side of the two negative meniscus lens elements in the negative first lens group; and vp1 designates the Abbe number of the positive lens element provided on the image-side of the two negative meniscus lens elements in the negative first lens group.

In the positive third lens group, two positive lens elements are preferably provided on the most image-side thereof; and the two positive lens elements preferably satisfy the following condition:

$$\text{AVE}(vpL) > 70 \tag{5}$$

wherein

AVE(vpL) designates an average value of the Abbe number of the two positive meniscus lens elements provided on the most image-side of the positive third lens group.

In the wide-angle lens system, focusing can be performed by moving the entire lens system, or by integrally moving the negative second lens group and the positive third lens group.

In the case where focusing is performed by integrally moving the negative second lens group and the positive third lens group, the wide-angle lens system preferably satisfies the following condition:

$$|f1/f| > 3 (f1 < 0) \tag{6}$$

wherein f1 designates the focal length of the negative first lens group; and f designates the focal length of the entire wide-angle lens system.

According to the wide-angle lens system of the present invention, the negative first lens group can further be provided with a positive lens element on the object-side of the two negative meniscus lens elements thereof.

The present disclosure relates to subject matter contained in Japanese Patent Application No. 2004-131996 (filed on Apr. 27, 2004) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the wide-angle lens system according to a first embodiment of the present invention;

FIGS. 2A, 2B, 2C, 2D and 2E show aberrations occurred in the lens arrangement of FIG. 1 when an object at infinity is in an in-focus state;

FIGS. 3A, 3B, 3C, 3D and 3E show aberrations occurred in the lens arrangement of FIG. 1 when an object at the shortest photographic distance is in an in-focus state;

FIG. 4 is a lens arrangement of the wide-angle lens system according to a second embodiment of the present invention;

FIGS. 5A, 5B, 5C, 5D and 5E show aberrations occurred in the lens arrangement of FIG. 4 when an object at infinity is in an in-focus state;

FIGS. 6A, 6B, 6C, 6D and 6E show aberrations occurred in the lens arrangement of FIG. 4 when an object at the shortest photographic distance is in an in-focus state;

FIG. 7 is a lens arrangement of the wide-angle lens system according to a third embodiment of the present invention;

FIGS. 8A, 8B, 8C, 8D and 8E show aberrations occurred in the lens arrangement of FIG. 7 when an object at infinity is in an in-focus state;

FIGS. 9A, 9B, 9C, 9D and 9E show aberrations occurred in the lens arrangement of FIG. 7 when an object at the shortest photographic distance is in an in-focus state;

FIG. 10 is a lens arrangement of the wide-angle lens system according to a fourth embodiment of the present invention;

FIGS. 11A, 11B, 11C, 11D and 11E show aberrations occurred in the lens arrangement of FIG. 10 when an object at infinity is in an in-focus state; and FIGS. 12A, 12B, 12C, 12D and 12E show aberrations occurred in the lens arrangement of FIG. 10 when an object at the shortest photographic distance is in an in-focus state.

DESCRIPTION OF THE PREFERRED EMBODIMENTS

As shown in each of FIGS. 1, 4, 7 and 10, the wide-angle lens system according to the present invention includes a negative first lens group 10, a negative second lens group 20, and a positive third lens group 30 which has a diaphragm S provided therewith, in this order from the object.

Focusing is performed by integrally moving the negative second 20 and the positive third lens groups 30 along the optical axis. This way of focusing can reduce the weight of the movable lens groups, compared with focusing performed by moving the entire lens system. Furthermore, the above way of focusing can easily attain an automatic focusing lens system. Namely, since the two lens groups closer to the camera body are made movable while the most object-side lens group (i.e., the negative first lens group 10) can be made stationary, a mechanism for automatic focusing can be made simpler.

The negative first lens group 10, with exception of the fourth embodiment shown in FIG. 10, includes two negative meniscus lens elements each having the convex surface facing toward the object, and a positive lens element, in this order from the object. Namely, the most image-side lens element of the negative first lens group 10 is this positive lens element.

In regard to the negative meniscus lens elements, due to the convex surface facing toward the object, a strong negative refractive power can be generated without causing astigmatism and coma. Not limited to the two negative meniscus lens elements, the number of the negative meniscus lens elements with the convex surface facing toward the object can be increased to three or more. This is because it is more advantageous to share the strong negative refractive power by more than three negative lens elements, if an attempt is made to obtain higher optical performance and a longer back focal distance.

Furthermore, according to the fourth embodiment shown in FIG. 10, a positive lens element is further provided on the object-side of the two negative meniscus lens elements.

In each of the first through fourth embodiments, the negative second lens group 20 includes cemented lens elements and a negative meniscus lens element having the convex surface facing toward the object, in this order from the object. Namely, the most image-side lens element of the negative second lens group 20 is this negative meniscus lens element.

In each of the first through fourth embodiments, the positive third lens group 30 includes a positive biconvex lens element, a positive meniscus lens element having the convex surface facing toward the image, a diaphragm S, a negative biconcave lens element, and two positive lens elements, in this order from the object.

From the viewpoint of the correcting of aberrations, it goes without saying that it is more advantageous for the positive third lens group 30 to share the refractive power thereof by more than three positive lens elements instead of the two positive lens elements.

Conditions (1), (2) and (3) are provided for obtaining a longer back focal distance and a wider angle-of-view (i.e., a shorter focal length).

More specifically, condition (1) is to attain a retrofocus type lens system with the negative first lens group 10 and the combination of the negative second and third lens groups (20, 30).

Condition (2) is to make the combined refractive power of the first lens group 10 and the second lens group 20 negative, and to obtain a retrofocus type lens system with the combination of the negative first and second lens groups (10, 20) and the positive third lens group 30.

Condition (3) is to attain a double retrofocus lens system at the same time with the following combinations of the lens groups:

(i) the negative first lens group 10 and the combination of the negative second and third lens groups (20, 30); and (ii) the combination of the negative first and second lens groups (10, 20) and the positive third lens group 30.

Condition (4) specifies a material of the positive lens element provided on the image-side of the two negative meniscus lens elements in the negative first lens group 10. The positive lens element is made of a material having high refractive index and large dispersion, since the positive lens element is to collect a divergent bundle of light rays emitted from at least the two negative meniscus lens elements, and to correct aberrations occurred in these meniscus lens elements by a smaller number of positive lens elements.

If a material having a lower refractive index which does not satisfy condition (4), the correcting of astigmatism becomes insufficient.

If a material having a smaller dispersion which does not satisfy condition (4), the correcting of lateral chromatic aberration becomes difficult.

Condition (5) specifies a material for the two positive lens elements provided on the most image-side of the positive third lens group 30, i.e., the most image-side of the entire wide-angle lens system. Providing a material having a larger Abbe number for the positive lens elements positioned on the most image-side of the entire wide-angle lens system is to mainly correct lateral chromatic aberration.

If a material having a larger dispersion is used to the extent that the lower limit of condition (5) is exceeded, the correcting of lateral chromatic aberration become difficult.

Condition (6) is for enabling a focusing operation through the combination of the negative second and third lens groups (20, 30) by increasing the absolute value of the focal length of the negative first lens group 10, compared with the combined focal length of the combination of the negative second and third lens groups (20, 30). When the absolute value of the focal length of the negative first lens group 10 becomes larger to the extent that condition (6) is satisfied, a rear focusing operation through the combination of the negative second and third lens groups (20, 30) becomes possible, while the negative first lens group 10 is made stationary.

If the absolute value of the focal length of the negative first lens group 10 exceeds the lower limit of condition (6), i.e., the refractive power becomes stronger, the fluctuation of spherical aberration largely occurs when focusing is performed by the combination of the negative second and third lens groups (20, 30).

Here, note that there is no need to satisfy condition (6), if focusing is arranged to be performed by moving the entire side-angle lens system.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, W designates the half angle-of-view (°) in the case where an object at infinity is in an in-focus state; Y designates the image height in the case where an object at the shortest photographic distance is in an in-focus state; and, the two types of dotted lines respectively indicate magnification with respect to the g and C lines; however, the d line as the base line coincides with the ordinate.

In the diagrams of astigmatism, W designates the half angle-of-view (°) in the case where an object at infinity is in an in-focus state; Y designates the image height in the case where an object at the shortest photographic distance is in an in-focus state; S designates the sagittal image; and M designates the meridional image.

In the diagrams of distortion, W designates the half angle-of-view (°) in the case where an object at infinity is in an in-focus state; and, Y designates the image height in the case where an object at the shortest photographic distance is in an in-focus state.

In the tables, FNO. designates the f-number, m designates the lateral magnification; f designates the focal length of the entire wide-angle lens system, fB designates the back focal distance, W designates the half angle-of-view (°), r designates the radius of curvature, d designates the lens-element thickness or distance between lens elements, $N_d$ designates the refractive index of the d-line, and ν designates the Abbe number.

In addition, note that the table for each embodiment show the numerical data on both cases where (i) an object at infinity is in an in-focus state, and (ii) an object at the shortest photographic distance is in an in-focus state.

[Embodiment 1]

FIG. 1 is the lens arrangement of the wide-angle lens system according to the first embodiment of the present invention. FIGS. 2A through 2E show aberrations occurred in the lens arrangement of FIG. 1 when an object at infinity is in an in-focus state. FIGS. 3A through 3E show aberrations occurred in the lens arrangement of FIG. 1 when an object at the shortest photographic distance is in an in-focus state. Table 1 shows the numerical data of the first embodiment.

The negative first lens group 10 includes the two negative meniscus lens elements each having the convex surface facing toward the object, and the positive lens element, in this order from the object.

The negative second lens group 20 includes the cemented lens elements and the negative meniscus lens element having the convex surface facing toward the object, in this order from the object.

The positive third lens group 30 includes the positive biconvex lens element, the positive meniscus lens element having the convex surface facing toward the image, the diaphragm S, the negative biconcave lens element, and the two positive lens elements, in this order from the object.

Focusing is performed by integrally moving the negative second 20 and the positive third lens group 30 along the optical axis.

Table 1 shows the numerical data of the first embodiment. The diaphragm S is provided 0.6 behind surface No. 15.

TABLE 1

FNO. = 1: 3.6–3.6
f = 14.16–14.50
m = 0.000—-0.134
fB = 35.79–37.91

| Surf. No. | r | d | $N_d$ | ν |
|---|---|---|---|---|
| 1 | 48.474 | 2.00 | 1.77250 | 49.6 |
| 2 | 19.996 | 7.47 | | |
| 3 | 77.210 | 1.70 | 1.80400 | 46.6 |
| 4 | 23.705 | 5.48 | | |
| 5 | 491.000 | 5.21 | 1.78470 | 26.3 |
| 6 | −46.399 | 5.30–3.17 | | |
| 7 | 52.927 | 2.50 | 1.71300 | 53.9 |
| 8 | 27.191 | 9.00 | 1.51633 | 64.1 |
| 9 | −27.191 | 0.11 | | |
| 10 | 18.545 | 1.00 | 1.80400 | 46.6 |
| 11 | 8.809 | 4.63 | | |
| 12 | 30.668 | 4.00 | 1.78470 | 26.3 |
| 13 | 239.940 | 1.52 | | |
| 14 | −20.520 | 6.00 | 1.48749 | 70.2 |
| 15 | −14.793 | 3.79 | | |
| 16 | −33.008 | 5.00 | 1.78470 | 26.3 |
| 17 | 41.504 | 1.51 | | |
| 18 | 5653.938 | 3.70 | 1.49700 | 81.6 |
| 19 | −14.882 | 0.10 | | |
| 20 | 113.933 | 3.22 | 1.48749 | 70.2 |
| 21 | −23.021 | — | | |

[Embodiment 2]

FIG. 4 is the lens arrangement of the wide-angle lens system according to the second embodiment of the present invention. FIGS. 5A through 5E show aberrations occurred in the lens arrangement of FIG. 4 when an object at infinity is in an in-focus state. FIGS. 6A through 6E show aberrations occurred in the lens arrangement of FIG. 4 when an object at the shortest photographic distance is in an in-focus state.

The basic lens arrangement of the second embodiment is the same as that of the first embodiment.

Table 2 shows the numerical data of the second embodiment. The diaphragm S is provided 1.2 behind surface No. 15.

TABLE 2

FNO. = 1: 3.6–3.6
f = 14.41–14.78
m = 0.000—-0.136
fB = 36.62–38.84

| Surf.No. | r | d | $N_d$ | ν |
|---|---|---|---|---|
| 1 | 48.346 | 1.90 | 1.77250 | 49.6 |
| 2 | 20.283 | 6.86 | | |
| 3 | 59.945 | 1.70 | 1.80610 | 40.9 |
| 4 | 22.235 | 6.11 | | |
| 5 | ∞ | 4.93 | 1.80518 | 25.4 |
| 6 | −47.013 | 5.18–2.96 | | |
| 7 | 43.104 | 2.50 | 1.71300 | 53.9 |
| 8 | 28.388 | 8.06 | 1.51633 | 64.1 |
| 9 | −28.388 | 0.11 | | |
| 10 | 26.684 | 1.00 | 1.80400 | 46.6 |
| 11 | 9.415 | 5.21 | | |
| 12 | 32.876 | 4.00 | 1.80518 | 25.4 |
| 13 | −1071.845 | 1.52 | | |
| 14 | −19.878 | 6.00 | 1.48749 | 70.2 |
| 15 | −16.625 | 5.03 | | |
| 16 | −43.187 | 5.00 | 1.80518 | 25.4 |
| 17 | 43.187 | 0.38 | | |
| 18 | 195.287 | 3.52 | 1.49700 | 81.6 |
| 19 | −15.517 | 0.10 | | |
| 20 | 132.793 | 2.97 | 1.48749 | 70.2 |
| 21 | −22.934 | — | | |

[Embodiment 3]

FIG. 7 is the lens arrangement of the wide-angle lens system according to the third embodiment of the present invention. FIGS. 8A through 8E show aberrations occurred in the lens arrangement of FIG. 7 when an object at infinity is in an in-focus state. FIGS. 9A through 9E show aberrations occurred in the lens arrangement of FIG. 7 when an object at the shortest photographic distance is in an in-focus state.

The basic lens arrangement of the third embodiment is the same as that of the first embodiment.

Table 3 shows the numerical data of the third embodiment. The diaphragm S is provided 0.6 behind surface No. 15.

TABLE 3

FNO. = 1: 2.9–3.0
f = 14.40–14.66
m = 0.000—-0.132
fB = 36.15–38.17

| Surf. No. | r | d | $N_d$ | ν |
|---|---|---|---|---|
| 1 | 48.486 | 2.20 | 1.77250 | 49.6 |
| 2 | 22.701 | 8.05 | | |
| 3 | 69.096 | 1.70 | 1.77250 | 49.6 |
| 4 | 27.862 | 5.65 | | |
| 5 | 239.414 | 5.30 | 1.78470 | 26.3 |
| 6 | −64.560 | 7.99–5.96 | | |
| 7 | 55.641 | 1.44 | 1.71300 | 53.9 |
| 8 | 22.697 | 6.64 | 1.51633 | 64.1 |
| 9 | −33.213 | 0.11 | | |
| 10 | 25.920 | 1.00 | 1.80400 | 46.6 |
| 11 | 9.065 | 2.57 | | |
| 12 | 29.862 | 4.00 | 1.78470 | 26.3 |
| 13 | −121.220 | 1.62 | | |
| 14 | −14.490 | 6.00 | 1.48749 | 70.2 |
| 15 | −13.318 | 4.84 | | |
| 16 | −32.744 | 5.00 | 1.78470 | 26.3 |

TABLE 3-continued

FNO. = 1: 2.9–3.0
f = 14.40–14.66
m = 0.000—-0.132
fB = 36.15–38.17

| Surf. No. | r | d | $N_d$ | ν |
|---|---|---|---|---|
| 17 | 40.203 | 0.97 | | |
| 18 | 139.711 | 4.11 | 1.49700 | 81.6 |
| 19 | −15.419 | 0.10 | | |
| 20 | 103.826 | 3.88 | 1.48749 | 70.2 |
| 21 | −20.796 | — | | |

[Embodiment 4]

FIG. 10 is the lens arrangement of the wide-angle lens system according to the fourth embodiment of the present invention. FIGS. 11A through 11E show aberrations occurred in the lens arrangement of FIG. 10 when an object at infinity is in an in-focus state. FIGS. 12A through 12E show aberrations occurred in the lens arrangement of FIG. 10 when an object at the shortest photographic distance is in an in-focus state.

In the negative first lens group 10 according to the fourth embodiment, the positive lens element is further provided on the most object-side of the wide-angle lens system (i.e., the object-side of the two negative meniscus lens elements), and the remaining lens arrangement is the same as that of the first embodiment.

Table 4 shows the numerical data of the fourth embodiment. The diaphragm S is provided 2.0 behind surface No. 17.

TABLE 4

FNO. = 1: 2.9–3.0
f = 14.38–14.80
m = 0.000—-0.137
fB = 36.98–39.25

| Surf. No. | r | d | $N_d$ | ν |
|---|---|---|---|---|
| 1 | 275.000 | 3.62 | 1.69680 | 55.5 |
| 2 | 3128.800 | 0.10 | | |
| 3 | 52.647 | 2.00 | 1.72916 | 54.7 |
| 4 | 21.250 | 5.67 | | |
| 5 | 42.904 | 1.70 | 1.78590 | 44.2 |
| 6 | 18.000 | 7.90 | | |
| 7 | −213.954 | 4.25 | 1.84666 | 23.8 |
| 8 | −46.738 | 4.43–2.16 | | |
| 9 | 42.227 | 8.11 | 1.48749 | 70.2 |
| 10 | −18.800 | 2.00 | 1.69100 | 54.8 |
| 11 | −24.846 | 0.11 | | |
| 12 | 36.085 | 1.00 | 1.80400 | 46.6 |
| 13 | 9.896 | 2.57 | | |
| 14 | 27.972 | 4.00 | 1.80518 | 25.4 |
| 15 | 2221.231 | 1.52 | | |
| 16 | −15.350 | 5.97 | 1.48749 | 70.2 |
| 17 | −14.780 | 6.35 | | |
| 18 | −42.300 | 5.00 | 1.78472 | 25.7 |
| 19 | 48.651 | 0.32 | | |
| 20 | 96.900 | 4.62 | 1.49700 | 81.6 |
| 21 | −15.180 | 0.10 | | |
| 22 | 83.620 | 3.59 | 1.48749 | 70.2 |
| 23 | −30.134 | — | | |

The numerical values of each embodiment for each condition are shown in Table 5.

TABLE 5

| | (1) | (2) | (3) | (4) | (5) | (6) |
|---|---|---|---|---|---|---|
| Embod. 1 | 1.86 | 1.70 | 1.09 | 1.78, 26.30 | 75.90 | 3.44 |
| Embod. 2 | 1.84 | 1.64 | 1.12 | 1.81, 25.40 | 75.90 | 3.34 |
| Embod. 3 | 1.64 | 1.59 | 1.03 | 1.78, 26.90 | 75.90 | 4.81 |
| Embod. 4 | 1.82 | 1.65 | 1.10 | 1.85, 23.80 | 75.90 | 3.12 |

As can be understood from Table 5, the numerical values of the first through fourth embodiments satisfy conditions (1) through (6). Furthermore, as shown in the aberration diagrams, the aberrations can be adequately corrected at each focal length.

According to the above description, the wide-angle lens system, which attains a half angle-of-view of about 45° or more, and also attains a longer back focal distance, can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A wide-angle lens system comprising a negative first lens group, a negative second lens group, and a positive third lens group, in this order from an object, wherein said negative first lens group comprises at least two negative meniscus lens elements each having the convex surface facing toward the object, and a positive lens element provided on the image-side of said two negative meniscus lens elements;

wherein said negative second lens group comprises cemented lens elements and a negative meniscus lens element having the convex surface facing toward the object; and wherein said wide-angle lens system satisfies the following conditions:

$f_{2-3}/f > 1.6$ $f_3/f > 1.5$ $(f_{2-3}/f)/(f_3/f) > 1.0$ wherein $f_{2-3}$ designates the combined focal length of said negative second lens group and said positive third lens group;

f designates the focal length of the entire wide-angle lens system; and $f_3$ designates the focal length of said positive third lens group.

2. The wide-angle lens system according to claim 1, further satisfying the following condition:

$np1 > 1.75$ and $vp1 < 30$ wherein np1 designates the refractive index of said positive lens element provided on the image-side of said two negative meniscus lens elements in said negative first lens group; and vp1 designates the Abbe number of said positive lens element provided on the image-side of said two negative meniscus lens elements in said negative first lens group.

3. The wide-angle lens system according to claim 1, wherein said positive third lens group comprises two positive lens elements provided on the most image-side thereof.

4. The wide-angle lens system according to claim 3, further satisfying the following condition:

$AVE(vpL) > 70$ wherein

AVE(vpL) designates an average value of the Abbe number of said two positive lens elements provided at the most image-side of said positive third lens group.

5. The wide-angle lens system according to claim 1, wherein focusing is performed by integrally moving said negative second lens group and said positive third lens group; and wherein said wide-angle lens system further satisfies the following condition:

$|f1/f| > 3 (f1 < 0)$ wherein f1 designates the focal length of said negative first lens group; and f designates the focal length of the entire wide-angle lens system.

6. The wide-angle lens system according to claim 1, wherein said negative first lens group further comprises a positive lens element provided on the object-side of said two negative meniscus lens elements thereof.

* * * * *